(12) United States Patent
Gudavalli et al.

(10) Patent No.: US 11,842,471 B2
(45) Date of Patent: Dec. 12, 2023

(54) RATIONAL POLYNOMIAL COEFFICIENT BASED METADATA VERIFICATION

(71) Applicant: Mayachitra, Inc., Santa Barbara, CA (US)

(72) Inventors: Chandrakanth Gudavalli, Santa Barbara, CA (US); Michael Gene Goebel, Santa Barbara, CA (US); Tejaswi Nanjundaswamy, Mountain View, CA (US); Lakshmanan Nataraj, Chennai (IN); Shivkumar Chandrasekaran, Santa Barbara, CA (US); Bangalore S. Manjunath, Santa Barbara, CA (US)

(73) Assignee: Mayachitra, Inc., Santa Barbara, CA (US)

( * ) Notice: Subject to any disclaimer, the term of this patent is extended or adjusted under 35 U.S.C. 154(b) by 360 days.

(21) Appl. No.: 17/342,992

(22) Filed: Jun. 9, 2021

(65) Prior Publication Data
US 2022/0398709 A1 Dec. 15, 2022

(51) Int. Cl.
*G06T 7/00* (2017.01)

(52) U.S. Cl.
CPC ........ *G06T 7/0002* (2013.01); *G06T 2200/24* (2013.01); *G06T 2207/10032* (2013.01); *G06T 2207/20056* (2013.01)

(58) Field of Classification Search
CPC .............. G06T 7/0002; G06T 2200/24; G06T 2207/10032; G06T 2207/20056
See application file for complete search history.

(56) References Cited

U.S. PATENT DOCUMENTS

| 2003/0044085 | A1* | 3/2003 | Dial, Jr. | G01C 11/02 382/293 |
| 2003/0112291 | A1* | 6/2003 | Mackay | B41J 25/001 347/14 |
| 2004/0234162 | A1* | 11/2004 | Jalobeanu | G06T 5/10 382/280 |
| 2014/0328545 | A1* | 11/2014 | Cauchy | G06T 5/006 382/305 |

(Continued)

OTHER PUBLICATIONS

Janos Horvath, David Guera, Sri Kalyan Yarlagadda, Paolo Bestagini, Fengqing Maggie Zhu, Stefano Tubaro, Edward J. Delp, "Anomaly-Based Manipulation Detection in Satellite Images", Proceedings of the IEEE/CVF Conference on Computer Vision and Pattern Recognition (CVPR) Workshops, 2019, pp. 62-71.*

(Continued)

*Primary Examiner* — Xuemei G Chen
(74) *Attorney, Agent, or Firm* — Schwegman Lundberg & Woessner, P.A.

(57) ABSTRACT

Systems and methods herein describe a metadata verification system that is configured to access a digital satellite image, generate a first discrete Fourier transform (DFT) pattern based on an ortho-rectified digital satellite image, generate a second DFT pattern based on rational polynomial coefficient (RPC) data of the digital satellite image, compare the first DFT pattern to the second DFT pattern, generate a score based on the comparison, and generate a determination of whether the digital satellite image has been manipulated based on the score.

20 Claims, 9 Drawing Sheets

(56) References Cited

U.S. PATENT DOCUMENTS

| | | | | |
|---|---|---|---|---|
| 2015/0042648 | A1* | 2/2015 | Jung | G06F 18/22 |
| | | | | 345/420 |
| 2015/0131870 | A1* | 5/2015 | Hudson | G06F 3/0483 |
| | | | | 382/112 |
| 2015/0302677 | A1* | 10/2015 | Mueller | B42D 25/21 |
| | | | | 382/137 |
| 2020/0134345 | A1* | 4/2020 | Joshi | G06V 40/45 |
| 2021/0201570 | A1* | 7/2021 | Yu | G06T 17/05 |

OTHER PUBLICATIONS

Chandrakanth Gudavalli, Michael Goebel, Tejaswi Nanjundaswamy, Lakshmanan Nataraj, Shivkumar Chandrasekaran, BS Manjunath, "Resampling Estimation based RPC Metadata Verification in Satellite Imagery", IEEE Transactions on Information Forensics and Security, vol. 18, 2023.*

Navdeep Kanwal, Akshay Girdhar, Lakhwinder Kaur, Jaskaran Singh Bhullar, "Detection of Digital Image Forgery using Fast Fourier Transform and Local Features", 2019 International Conference on Automation, Computational and Technology Management (ICACTM), Amity University, 2019.*

\* cited by examiner

RATIONAL POLYNOMIAL COEFFICIENT BASED METADATA VERIFICATION

This invention was made with Government support under Contract Number HM047619C0056 awarded by The National Geospatial-Intelligence Agency. The Government has certain rights in this invention.

TECHNICAL FIELD

Embodiments herein generally relate to data verification. More specifically, but not by way of limitation, systems and methods described herein provide rational polynomial coefficient based metadata verification.

BACKGROUND

Metadata verification of digital images is helpful in ascertaining the authenticity of those digital images. In some examples, digital image manipulations that may not be visible to the human eye may nonetheless contain misrepresentations and other falsified information.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

There has been a growing interest in determining authenticity of digital satellite images. Digital satellite images have two crucial components: image pixels and metadata associated with the digital satellite image. Digital satellite images contain metadata including, but not limited to, rational polynomial coefficient (RPC) metadata. The RPC metadata of a digital satellite image provides information on the location of a satellite at the point in time during which the satellite captured the digital satellite image and other relevant satellite camera parameters.

Image metadata is a useful source of data about the digital image content. While it is possible to tamper digital images on the pixel level, it is also possible to manipulate the metadata associated with the digital image such as the date, time, and location. Digital satellite images are geometrically corrected (e.g., ortho-rectified) by applying the RPC data to the digital images.

After ortho-rectification, the metadata that is associated with the digital satellite image includes cloud cover data, capture times-tamp, latitude-longitude information, RPC metadata, and the like. The RPC metadata associated with a digital satellite image is useful in obtaining the pixel coordinates of a given object or a given latitude-longitude in the originally captured satellite image. Tampering of the RPC metadata raises suspicions on the authenticity of a digital image. To this end, verification of the RPC metadata provides a level of confidence that indicates that the digital satellite image was not manipulated or otherwise tampered with.

Various embodiments describe herein provide systems and methods for RPC metadata verification of digital satellite images. A metadata verification system describe herein can access a digital satellite image and generate an ortho-rectified digital satellite image. The metadata verification system can calculate a residual Discrete Fourier Transform (DFT) pattern from the ortho-rectified digital satellite image and calculate an expected DFT pattern from the RPC data associated with the original digital satellite image. The metadata verification system can compute a distance between the residual DFT pattern and the expected DFT pattern and generate a score based on the distance. For some embodiments, a low score indicates that the residual DFT pattern and the expected DFT pattern are similar, whereas a high score indicates that there are significant differences between the residual DFT pattern and the expected DFT pattern.

Figure 1:
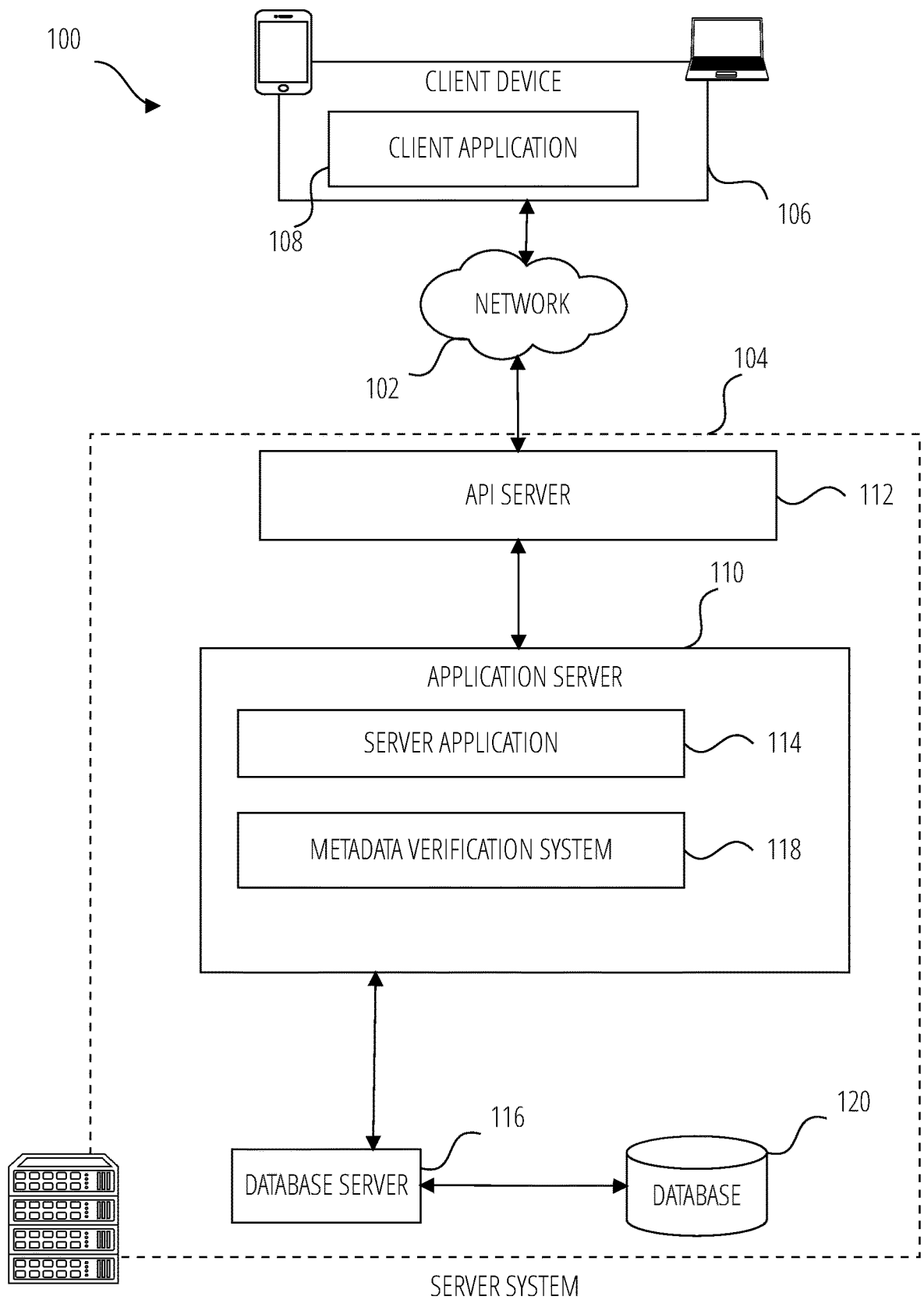
FIG. 1 is a block diagram illustrating an example image analysis system over a network.

FIG. 1 is a block diagram illustrating an example image analysis system 100 over a network. The system 100 includes multiple instances of a client device 106, each of which hosts a number of applications including a client application 108. Each client application 108 is communicatively coupled to other instances of the client application 108 and a server system 104 via a network 102 (e.g., the Internet).

A client application 108 is able to communicate and exchange data with another client application 108 and with the server system 104 via the network 102. The data exchanged between client application 108, and between a client application 108 and the server system 104, includes functions (e.g., commands to invoke functions) as well as payload data (e.g., text, audio, video or other multimedia data).

The server system 104 provides server-side functionality via the network 102 to a particular client application 108. While certain functions of the system 100 are described herein as being performed by either a client application 108 or by the server system 104, the location of certain functionality either within the client application 108 or the server system 104 is a design choice. For example, it may be technically preferable to initially deploy certain technology and functionality within the server system 104, but to later migrate this technology and functionality to the client application 108 where a client device 106 has a sufficient processing capacity.

The server system 104 supports various services and operations that are provided to the client application 108. Such operations include transmitting data to, receiving data from, and processing data generated by the client application 108. This data may include, message content, client device information, geolocation information, as examples. Data exchanges within the system 100 are invoked and controlled through functions available via user interfaces (UIs) of the client application 108.

Turning now specifically to the server system 104, an Application Program Interface (API) server 112 is coupled to, and provides a programmatic interface to, an application server 110. The application server 110 is communicatively coupled to a database server 116, which facilitates access to a database 120 in which is stored data associated with messages processed by the application server 110.

The Application Program Interface (API) server 112 receives and transmits message data (e.g., commands and message payloads) between the client device 106 and the application server 110. Specifically, the Application Program Interface (API) server 112 provides a set of interfaces (e.g., routines and protocols) that can be called or queried by the client application 108 in order to invoke functionality of the application server 110. The Application Program Interface (API) server 112 exposes various functions supported by the application server 110.

The application server 110 hosts a number of applications and subsystems, including a server application 114, and a metadata verification system 118.

The server application 114 implements a number of data processing technologies and functions. Other processor and memory intensive processing of data may also be performed server-side by the server application 114, in view of the hardware requirements for such processing.

The metadata verification system 118 supports various data processing services described herein and makes these functions and services available to the server application 114. For some embodiments, the metadata verification system 118 analyzes digital satellite images and generates a determination of whether the digital satellite image has been manipulated. The metadata verification system 118 generates a first discrete Fourier transform (DFT) pattern based on an ortho-rectified version of the digital satellite image and generates a second DFT pattern based on rational polynomial coefficient (RPC) data from the digital satellite image. The two DFT patterns are compared and the metadata verification system 118 generates a score representing the similarity between the two DFT patterns. Based on the score, the metadata verification system 118 determines if the original digital satellite image has been manipulated.

The application server 110 is communicatively coupled to a database server 116, which facilitates access to a database 120 in which is stored data associated with messages processed by the server application 114.

Figure 2:
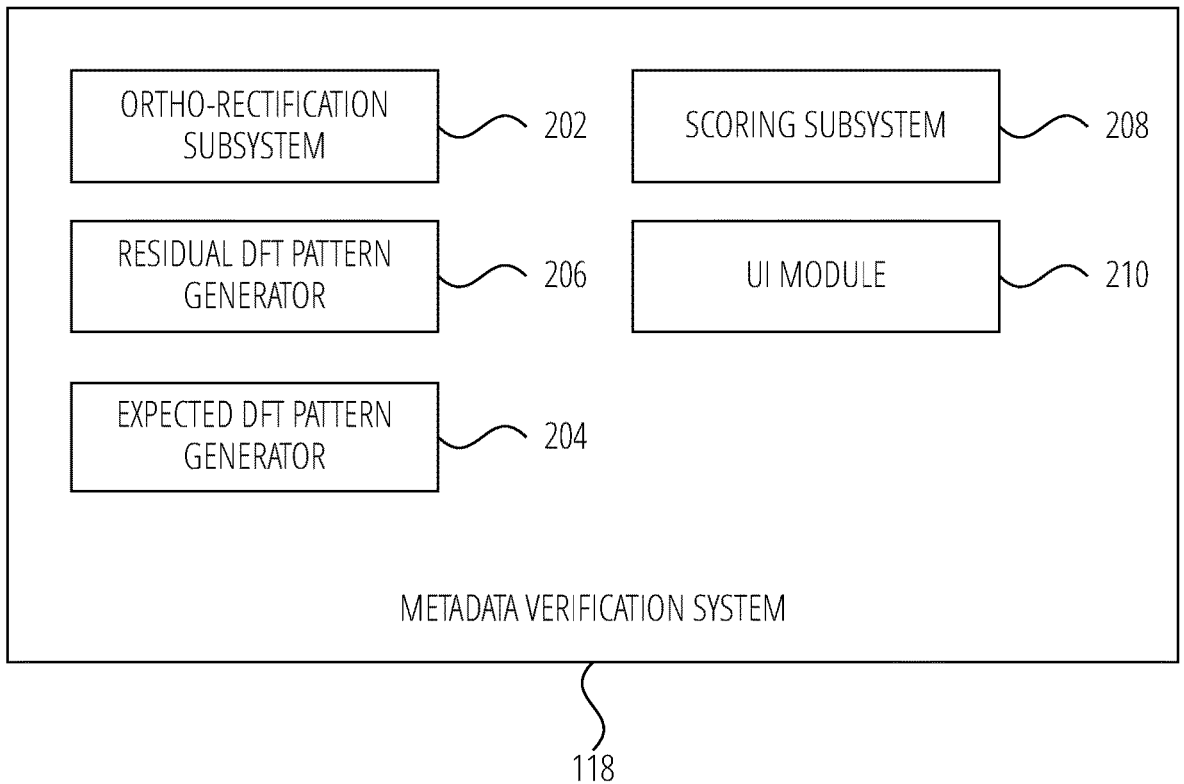
FIG. 2 is a block diagram illustrating an example metadata verification system, according to example embodiments.

FIG. 2 is a block diagram illustrating an example of the metadata verification system 118, according to example embodiments. In FIG. 2, the metadata verification system 118 is shown to include an ortho-rectification subsystem 202, a residual DFT pattern generator 206, an expected DFT pattern generator 204, a scoring subsystem 208 and a UI module 210.

The ortho-rectification subsystem 202 generates an ortho-rectified digital satellite image from an input digital satellite image. Images acquired by a satellite may appear distorted due to at least, topography, lens distortion and position of the satellite camera. In order to correct the distortion in digital satellite images, the digital satellite image may be geometri- cally corrected. The geometrically corrected (e.g., ortho-rectified) image appears to be captured by placing a camera at a point directly above an object or area of interest. Ortho-rectification is the process of transforming an image onto its upright planimetry map by removing the perspective angle. Ortho-rectification is performed using RPC data based on empirical mathematical models that relate the geographic location (latitude/longitude denoted by X, Y respectively) and the surface elevation data (denoted by Z) to image row and column positions (denoted by r and c respectively). Satellite sensor models are empirical mathematical models that relate image coordinates (row and column positions) to latitude and longitude using terrain surface elevation. A single image has two rational polynomials, one for computing a row position and one for computing a column position:

$$r = \frac{P_1(X, Y, Z)}{P_2(X, Y, Z)}, c = \frac{P_3(X, Y, Z)}{P_4(X, Y, Z)},$$

where each P*(X,Y,Z) is a cubic with 20 coefficients. The coefficients of the two rational polynomials are computed from the satellite camera's orbital position, orientation and corresponding satellite sensor model.

The ortho-rectification subsystem 202 uses the original digital satellite image, its corresponding RPC data and a Digital Elevation Map (DEM) to supplement elevation values and generates an ortho-rectified satellite image. The DEM may be accessed by the ortho-rectification subsystem 202 from one or more databases 120.

The residual DFT pattern generator 206 generates a discrete Fourier transform (DFT) pattern based on the ortho-rectified digital satellite image. The residual DFT pattern generator 206 assumes that the pixel noise variance in the original satellite image is a constant, θ. For points where the ortho-rectified satellite image pixels map directly onto original satellite image pixels, the pixel noise variance will also be θ. Points that lie equidistance from its four nearest neighbors will have a pixel noise variance of θ/4. Affine resampling methods (e.g., image rotation, zooming in or out of an image, upsampling, down sampling, ortho-rectification, and the like) can introduce periodic patterns in the ortho-rectified pixel noise variance. The periodic patterns can become more evident after its transformation into the frequency domain by applying a DFT.

To estimate pixel noise variance in an image, the residual DFT pattern generator 206 uses a convolutional kernel removes a portion of image content. The remaining portion of the image content is the image content is the content that creates the residual DFT pattern. An example convolutional kernel is as follows:

$$\begin{bmatrix} -1/4 & 1/2 & -1/4 \\ 1/2 & -1 & 1/2 \\ -1/4 & 1/2 & -1/4 \end{bmatrix}$$

The filtered image (e.g., the image generated after application of the convolutional kernel) is an estimate of the pixel noise values at each pixel. The residual DFT pattern generator 206 applies a non-liner function is applied to determine the pixel noise variance estimate. For example, the function may be a Gaussian function. The application of the Gaussian function can remove outliers from the residual DFT pattern to generate a compact DFT pattern. The residual DFT pattern generator 206 performs subsequent processing steps on the compact DFT pattern. For example, the residual DFT pattern generator 206 multiples the compact DFT pattern with a hyperbolic function.

The expected DFT pattern generator 204 generates an ortho-rectified synthetic image by applying the RPC data to the synthetic image. Affine resampling methods introduce periodic patterns in the pixel noise variance of the ortho-rectified synthetic image. The periodic patterns become more evident after applying a two-dimensional DFT.

To estimate the expected pixel noise variance at each point in the synthetic image, the expected DFT pattern generator 204 computes a distance between the new ortho-rectified pixel location and its nearest neighbor in the original synthetic image. In some examples, the distance is the L1-distance. The pixel noise variance has an inverse relationship with respect to the distance. To obtain the distance, the expected DFT pattern generator 204 initializes a matrix of the same height and width of the original synthetic image with four channels. The matrix is filled with values such that any 2×2 block contains four orthogonal vectors. An example matrix Y is shown below where Y is an example synthetic image:

$$Y = \begin{bmatrix} a & b & a & b & \ldots \\ c & d & c & d & \\ a & b & a & b & \\ c & d & c & d & \\ \vdots & & & & \ddots \end{bmatrix}$$

$a = [k,0,0,0], b = [0,k,0,0,], c = [0,0,k,0], d = [0,0,0,k]$

The matrix, Y (e.g., the synthetic image), is passed through the same transformation pipeline as the original synthetic image, using ortho-rectification to generate a transformed matrix, X (e.g., the ortho-rectified synthetic image). From the ortho-rectified synthetic image pattern, the ortho-rectification formula can be reversed to obtain the original distances used. For example, Let $\underline{Y}$ be the 2×2 matrix of neighboring pixels in the original synthetic image:

$$\underline{Y} = \begin{bmatrix} a & b \\ c & d \end{bmatrix} \quad (1)$$

where, $$a = \begin{bmatrix} k \\ 0 \\ 0 \\ 0 \end{bmatrix}, b = \begin{bmatrix} 0 \\ k \\ 0 \\ 0 \end{bmatrix}, c = \begin{bmatrix} 0 \\ 0 \\ k \\ 0 \end{bmatrix}, d = \begin{bmatrix} 0 \\ 0 \\ 0 \\ k \end{bmatrix} \quad (2)$$

Let $\underline{X}$ be the interpolated pixel that is generated by using bi-linear interpolation of the four pixels in $\underline{Y}$. Therefore, $$\underline{X} = [(1-y)y][\underline{Y}]\begin{bmatrix} 1-x \\ x \end{bmatrix} \quad (3)$$

where x is the sub-integer shift in the direction of a horizontal axis and y is a sub-integer shift in the direction of a vertical axis.

From Equation 1 and Equation 3 the expected DFT pattern generator 204 can derive, $$\underline{X} = k\begin{bmatrix} (1-y)(1-x) \\ (1-y)x \\ y(1-x) \\ yx \end{bmatrix} \quad (4)$$

$$\begin{bmatrix} X_0 \\ X_1 \\ X_2 \\ X_3 \end{bmatrix} = k\begin{bmatrix} (1-y)(1-x) \\ (1-y)x \\ y(1-x) \\ yx \end{bmatrix} \quad (5)$$

From Equation 5, the expected DFT pattern generator 204 can derive, $$x = \frac{X_1}{X_1 + X_0} \quad (6)$$

$$y = \frac{X_2}{X_2 + X_0} \quad (7)$$

$\underline{Y}$ may not always be as shown in Equation 1. It can be any rotation or reflection of the 2×2 matrix in equation 1. In some examples, $$\underline{Y} = \begin{bmatrix} d & b \\ c & a \end{bmatrix} \quad (8)$$

The expected DFT pattern generator 204 can derive, $$\underline{X} = k\begin{bmatrix} xy \\ (1-y)x \\ y(1-x) \\ (1-x)(1-y) \end{bmatrix} \quad (9)$$

From Equation 9, the expected DFT pattern generator 204 determines that, $$\frac{X_1}{X_1 + X_0} = 1 - y \quad (10)$$

$$\frac{X_2}{X_2 + X_0} = 1 - x \quad (11)$$

Figure 3:
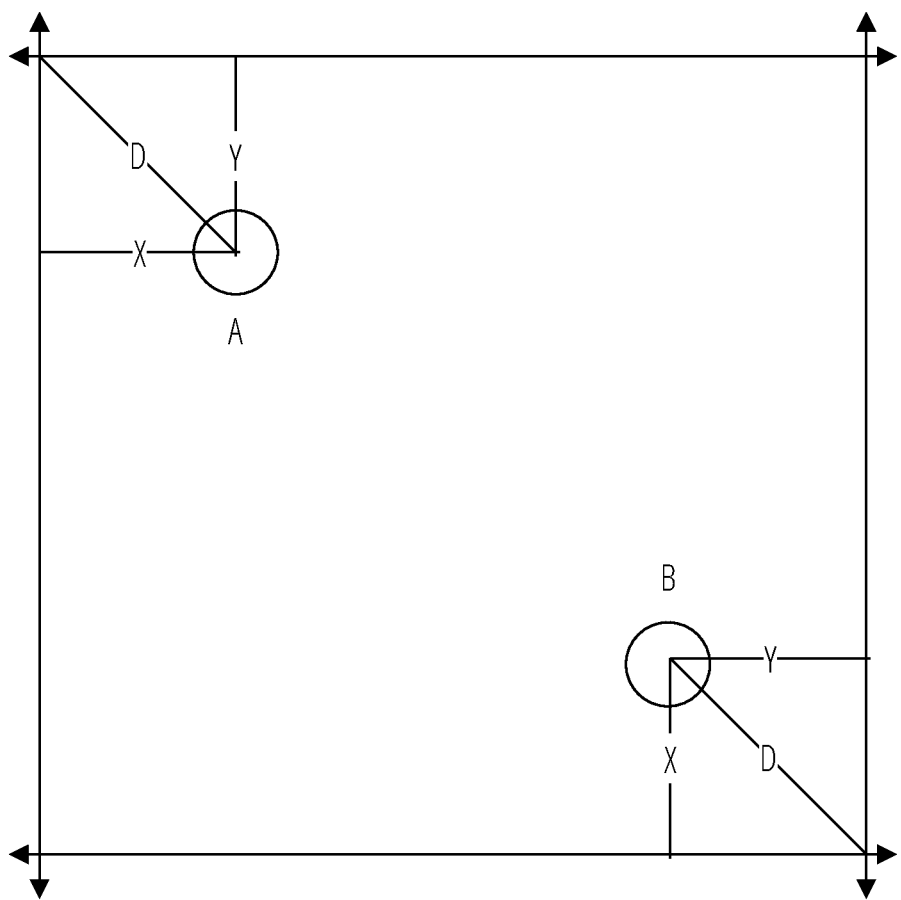
FIG. 3 is a diagram illustrating an example of resampling spatial mapping, according to example embodiments.

Equation 10 and Equation 11 imply that the expected DFT pattern generator 204 derives the point B as shown in FIG. 3 instead of point A (as derived by equations 6 and 7). However, as shown by FIG. 3, the distance d (e.g., the L1-distance), to the nearest neighbor in both cases is the same. The expected DFT pattern is thus generated by computing the two-dimensional DFT of this expected prediction residue, d.

The scoring subsystem 208 generates a score (e.g., on a scale of 1 to 5) that rates the similarity between the residual DFT pattern and the expected DFT pattern. A low score (e.g., close to 0) indicates that the residual DFT pattern and the expected DFT pattern are highly similar. A high score (e.g., close to 5) indicates that the residual DFT pattern and the expected DFT pattern are not similar.

In some examples, the scoring subsystem 208 uses a structural similarity index measure (SSIM) to determine if the residual DFT pattern and the expected DFT patterns are similar. SSIM compare luminance (l), contrast (c), and structure (s). The scoring subsystem 208 computes the overall score as follows, $$l(x, y) = \frac{2\mu_x\mu_y + c_1}{\mu_x^2 + \mu_y^2 + c_1}$$

$$c(x, y) = \frac{2\sigma_x\sigma_y + c_2}{\sigma_x^2 + \sigma_y^2 + c_2}$$

$$s(x, y) = \frac{2\sigma_{xy} + c_3}{\sigma_x\sigma_y + c_3}$$

$$c_3 = c_2/2$$

$$SSIM(x, y) = [l(x, y)^\alpha \cdot c(x, y)^\beta \cdot s(x, y)^\gamma]$$

The scoring subsystem 208 assumes $\alpha$, $\beta$, $\gamma=1$. Since SSIM measures similarity (e.g., 1=matched and 0=mismatched), the scoring subsystem 208 uses (1−SSIM(x,y)). In some examples, the scoring subsystem 208 normalizes the scores using a sigmoid function f(x), $$f(x) = \frac{1}{1 + e^{-\lambda_e(x-\mu_e)}}$$

In some examples, other structure similarity measures are used such as Color Layout Descriptor (CLD), Homogeneous Texture Descriptor (HTD) or the GIST Image Descriptor. However, it is to be understood that any metric for determining the similarity between two images may be used.

In some examples, a user may upload the digital satellite image via a network 102 using the UI module 210. The UI module 210 may cause presentation of the residual DFT pattern generated by the residual DFT pattern generator 206 and the expected DFT pattern generated by the expected DFT pattern generator 204. The UI module 210 may include selectable user interface elements (e.g., buttons, navigational bars, drop-down menus and the like). A user of the client device may use the UI module 210 to analyze the generated DFT patterns. For example, the user may use the selectable user interface elements to annotate or markup portions of the generated DFT patterns. In some examples, the UI module 210 causes presentation of a type of image manipulation that was performed on the digital satellite image. For example, if the metadata verification system 118 determines that the RPC data of the digital satellite image was modified by changing the latitude and longitude coordinates of the digital satellite image, the UI module 210 may cause presentation of a notification that alerts the user to the discrepancy of the latitude and longitude coordinates of the digital satellite image.

Figure 4:
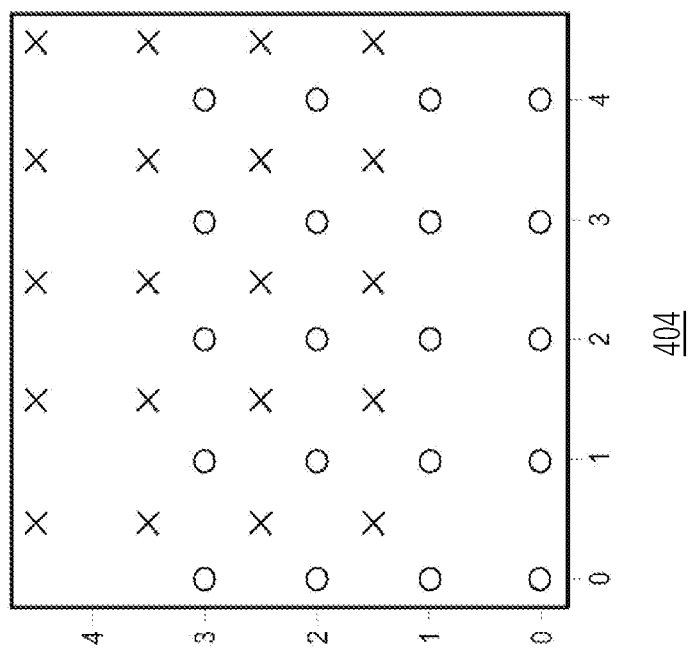
FIG. 4 is a diagram illustrating an example of two resampling patterns according to some example embodiments
Figure 4:
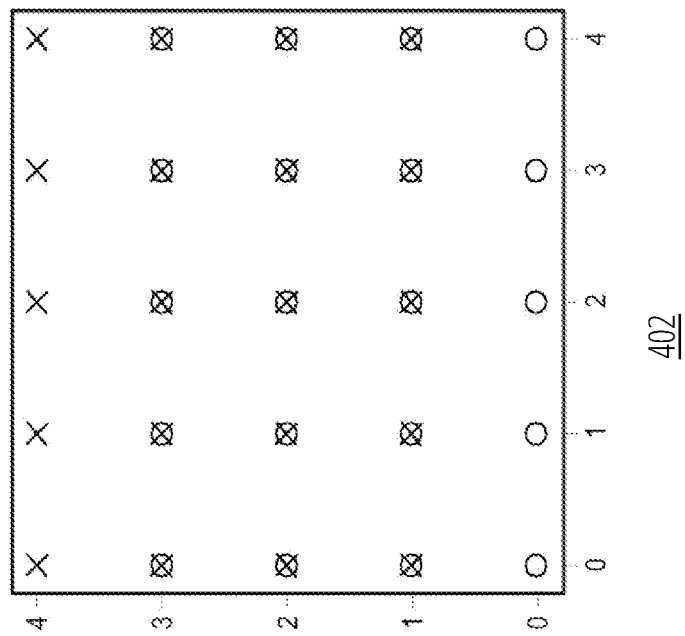

FIG. 4 is an illustration of two resampling patterns according to some example embodiments. In pattern 402, the integer-shift is equivalent to an image crop and the pattern 402 will not change image statistics. In pattern 404, there is a vertical shift of 1.5 pixels and a horizontal shift of 0.5 pixels. In pattern 404, the sub-integer shift is significant and would impact the pixel noise variance patterns. Patterns 402, 404 may be example changes performed on a digital satellite image. A metadata verification system 118 analyzing an image pattern 402 will determine that the original input image (e.g., a digital satellite image) was not manipulated. However, a metadata verification system 118 analyzing an image pattern 404 will determine that the input image was manipulated.

Figure 5:
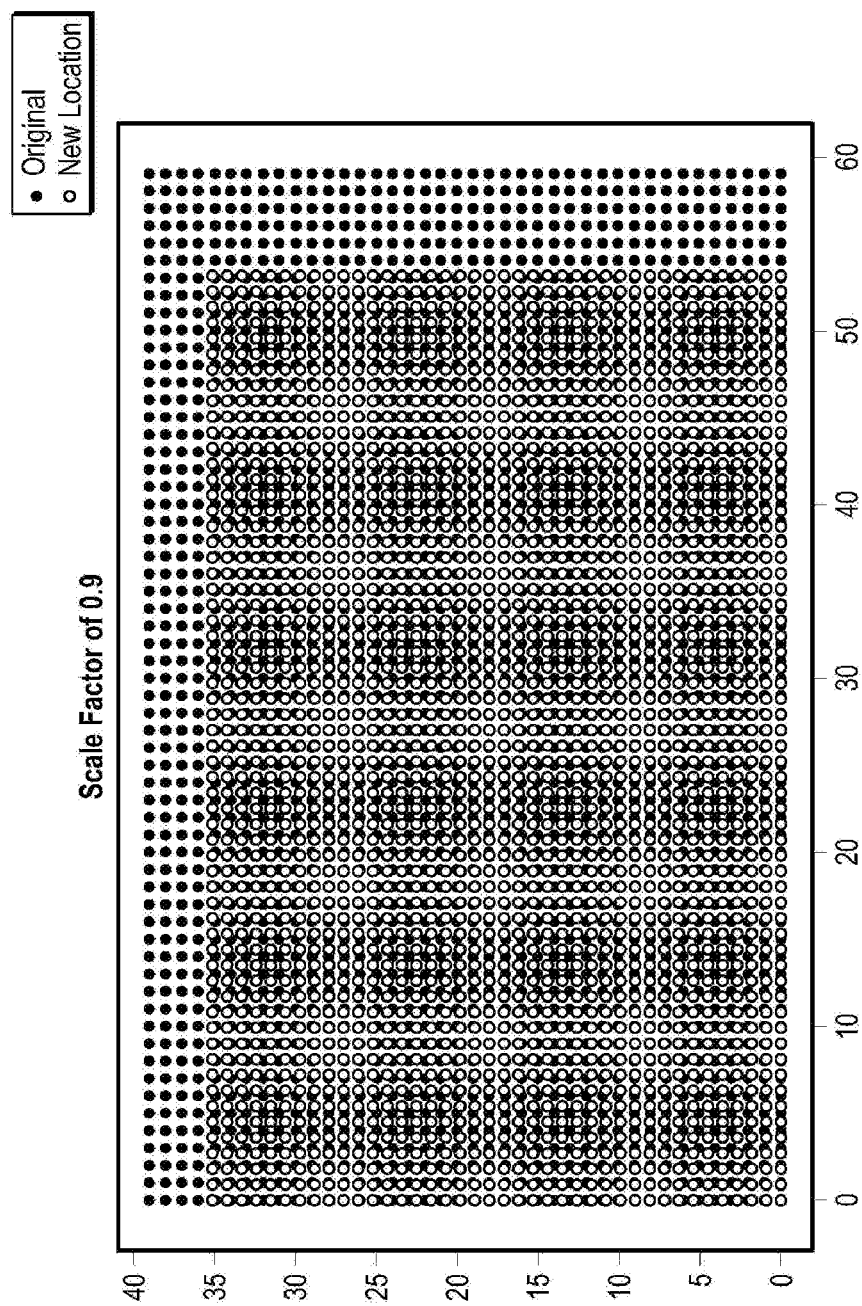
FIG. 5 is a diagram illustrating an example of resampling spatial mapping with a scale factor, according to example embodiments

FIG. 5 is an illustration of resampling spatial mapping with a scale factor, according to example embodiments. FIG. 5 represents the pixel displacements that occurred due to resampling techniques in which the image is scaled by a factor of 0.9. The expected distance between any new pixel location (in an ortho-rectified image) and its nearest neighbor in the original image should be higher in areas with more white-space, and lower in areas with minimal overlap between the dots. Thus, as discussed above, affine resampling methods can introduce periodic patterns in the ortho-rectified pixel noise variance. These periodic patterns can become more evident after its transformation into the frequency domain by computing its DFT. The metadata verification system 118 identifies that the period patterns indicate that the original image has been manipulated.

Figure 6:
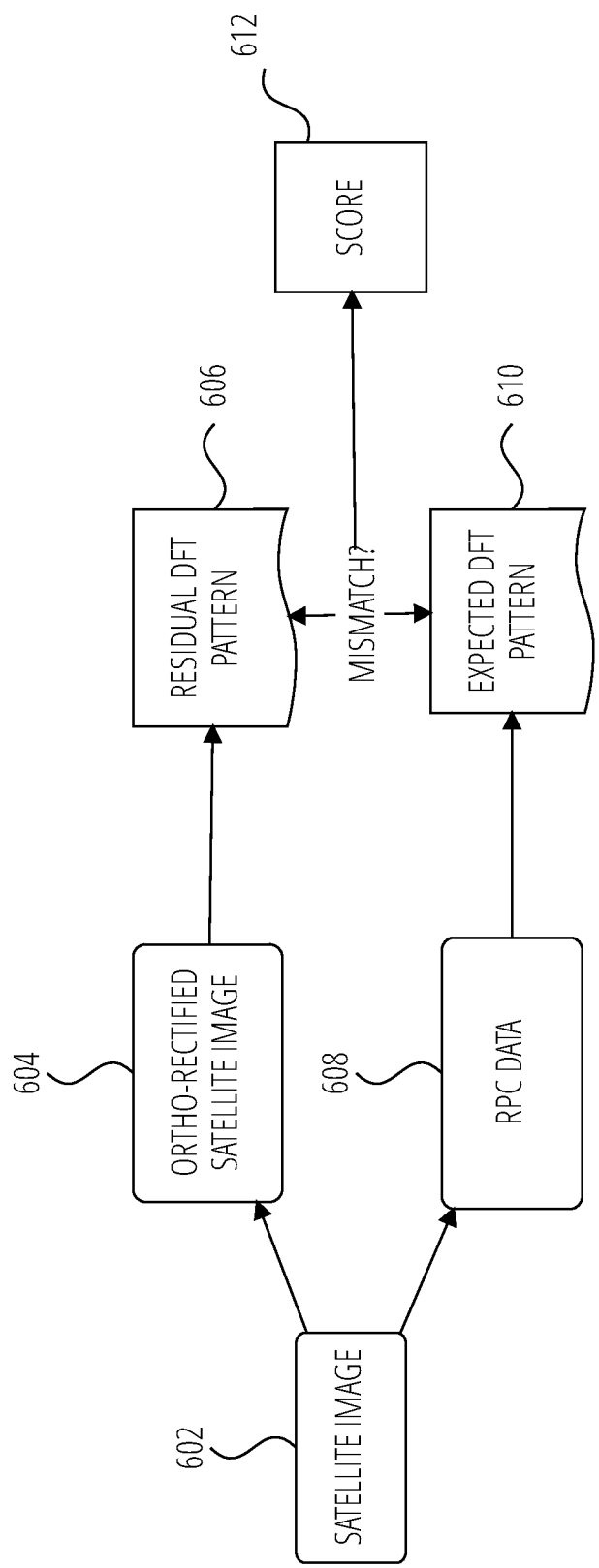
FIG. 6 is a flow diagram illustrating an example metadata verification system, according to example embodiments.

FIG. 6 is an illustration of the metadata verification system 118, according to example embodiments.

The metadata verification system 118 receives a satellite image 602 and generates an ortho-rectified satellite image 604. The metadata verification system 118 generates a residual DFT pattern 606 from the ortho-rectified satellite image 604. The metadata verification system 118 further extracts RPC data 608 from the satellite image 602 and generates an expected DFT pattern 610 from the RPC data 608. The residual DFT pattern 606 and the expected DFT pattern 610 are compared to determine if there is a mismatch in the DFT patterns. Based on the level of mismatch between the DFT patterns, the metadata verification system 118 generates a score 612.

Although the described flow diagram below can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 7:
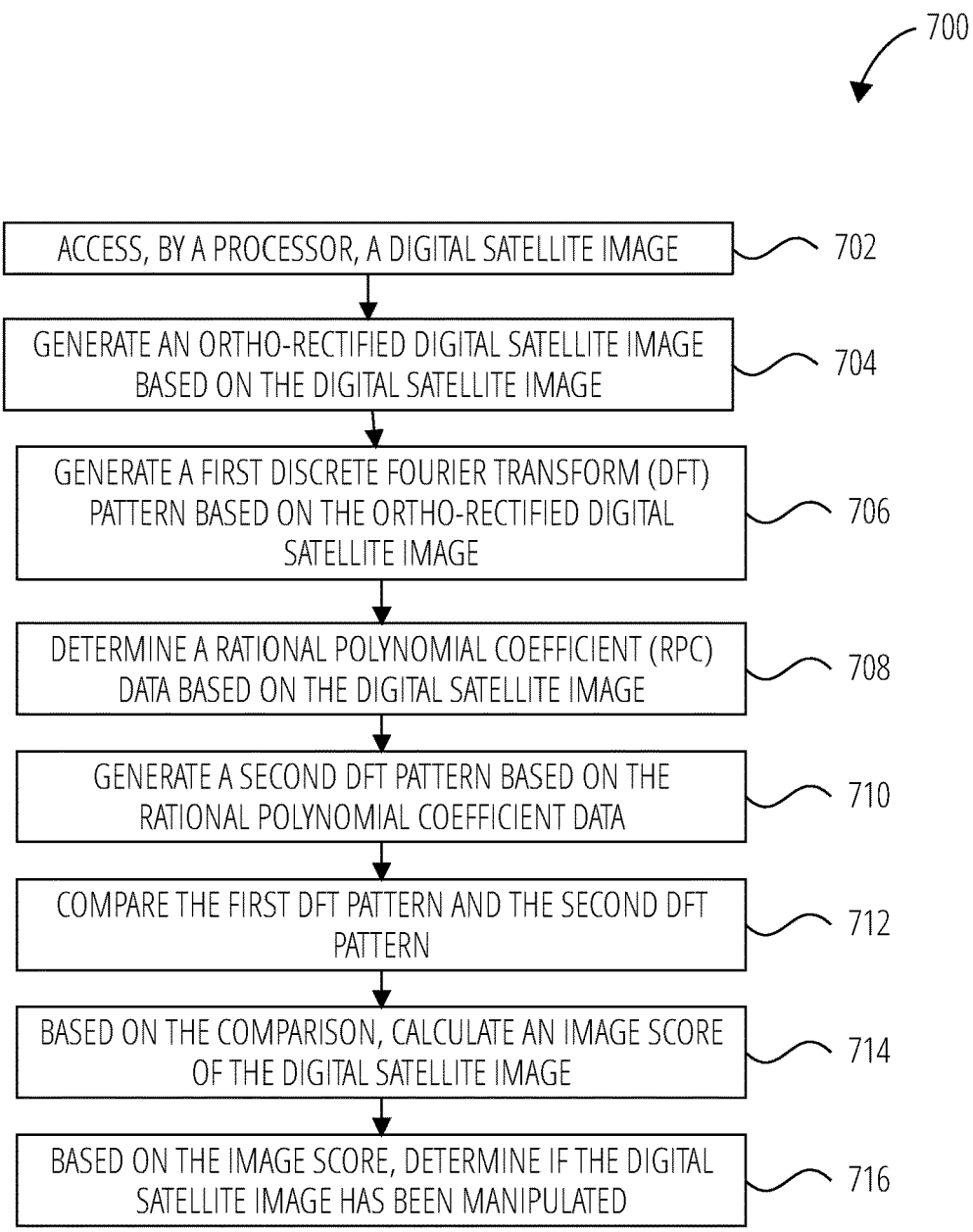
FIG. 7 is a flow diagram illustrating an example method for rational polynomial coefficients based metadata verification of digital satellite images, according to example embodiments.

FIG. 7 is an example method for RPC based metadata verification of satellite images, according to example embodiments. The operations of FIG. 7 may be performed by the metadata verification system 118. In one example, the processor in a metadata verification system 118, the processor in the client device 106, the processor in the server system 104 or any combination thereof, can perform the operations in the method 700.

At operation 702, the metadata verification system 118 accesses, by a processor, a digital satellite image. At operation 704, the metadata verification system 118 generates an ortho-rectified digital satellite image based on the digital satellite image. The ortho-rectified satellite image 604 may be generated by applying the RPC data 608 of the satellite image 602 to the satellite image 602. In some examples, operation 704 is performed by the ortho-rectification subsystem 202.

At operation 706, the metadata verification system 118 generates a first discrete Fourier transform (DFT) pattern based on the ortho-rectified digital satellite image. The first DFT pattern may be the residual DFT pattern 606. The residual DFT pattern 606 may be generated by the residual DFT pattern generator 206.

At operation 708, the metadata verification system 118 determines a rational polynomial coefficient (RPC) data 608 based on the digital satellite image. At operation 710, the metadata verification system 118 generates a second DFT pattern from the RPC data 608. The second DFT pattern may be the expected DFT pattern 610. The expected DFT pattern 610 is generated by the expected DFT pattern generator 204.

At operation 712, the metadata verification system 118 compares the first DFT pattern and the second DFT pattern. For example, the metadata verification system 118 uses an image similarity metric (e.g., SSIM) to compare the residual DFT pattern 606 and the expected DFT pattern 610. The comparison may be performed by the scoring subsystem 208.

At operation 714, the metadata verification system 118 calculates an image score of the satellite image based on the comparison. For example, the image score may be generated by the scoring subsystem 208.

At operation 716, the metadata verification system 118 determines if the digital satellite image has been manipulated based on the image score. In some examples, the metadata verification system 118 determines (e.g., generates an analysis of) a type of manipulation of the digital satellite image. For example, the metadata verification system 118 may determine aspects of the RPC data 608 that have been manipulated or otherwise tampered with. In some examples, the metadata verification system 118 may determine a type of affine transformation (e.g., seam-carving, upsampling, downsampling, and the like) that was applied to the original satellite image.

In some examples, the metadata verification system 118 causes display of the first DFT pattern (e.g., the residual DFT pattern 606) and the second DFT pattern (e.g., the expected DFT pattern 610) on a graphical user interface of the client device. A user may use the UI module 210 to analyze, edit or otherwise annotate the presented DFT patterns.

Figure 8:
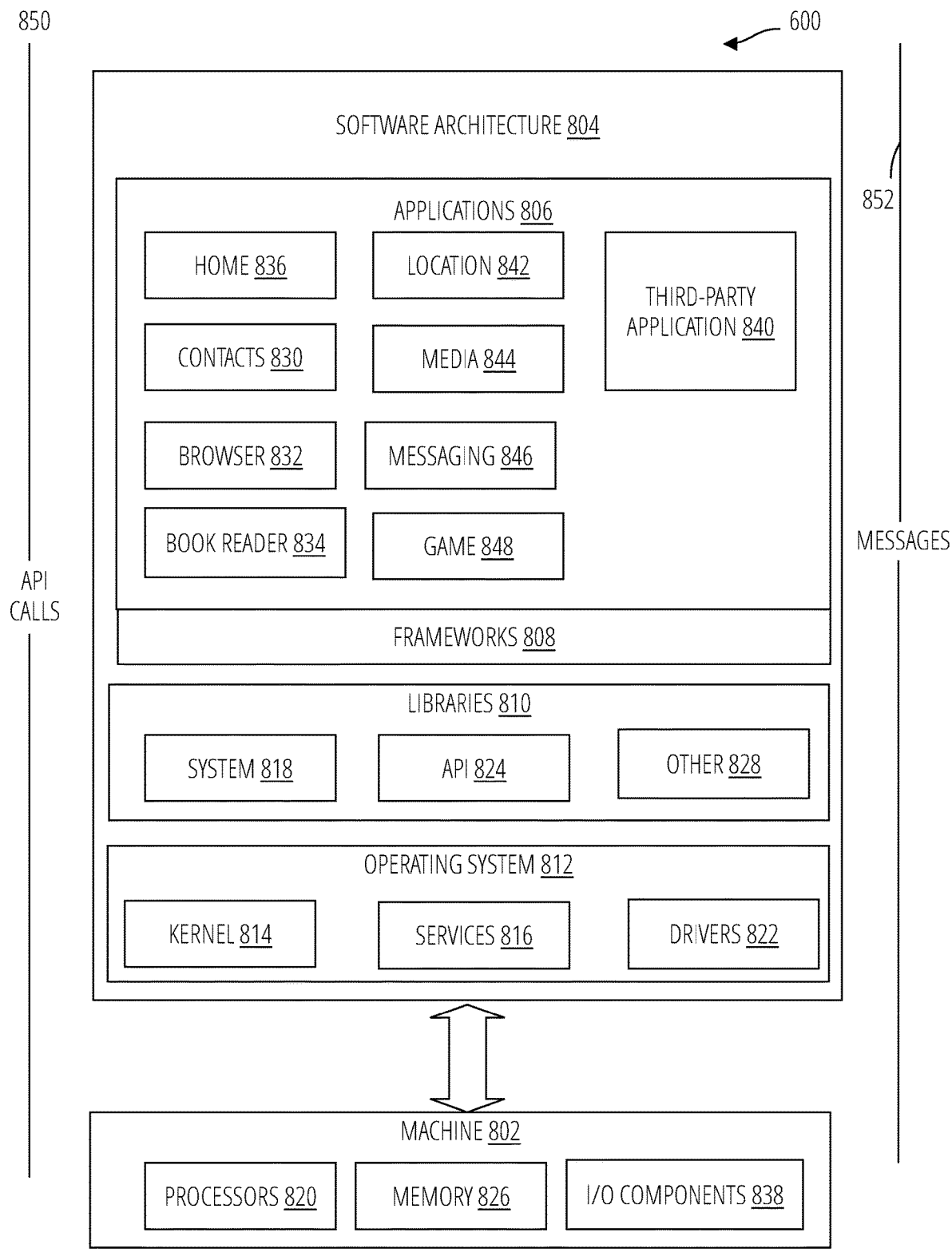
FIG. 8 is a block diagram showing a software architecture within which the present disclosure may be implemented, in accordance with example embodiments.

FIG. 8 is a block diagram 600 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionality. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 810 provide a low-level common infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 828 to provide many other APIs to the applications 806.

The frameworks 808 provide a high-level common infrastructure that is used by the applications 806. For example, the frameworks 808 provide various graphical user interface (deleted) (GUI) functions, high-level resource management, and high-level location (deleted) services. The frameworks 808 can provide a broad spectrum of other APIs that can be used by the applications 806, some of which may be specific to a particular operating system or platform.

In an example embodiment, the applications 806 may include a home application 836, a contacts application 830, a browser application 832, a book reader application 834, a location application 842, a media application 844, a messaging application 846, a game application 848, and a broad assortment of other applications such as a third-party application 840. The e applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party application 840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 840 can invoke the API calls 850 provided by the operating system 812 to facilitate functionality described herein.

Figure 9:
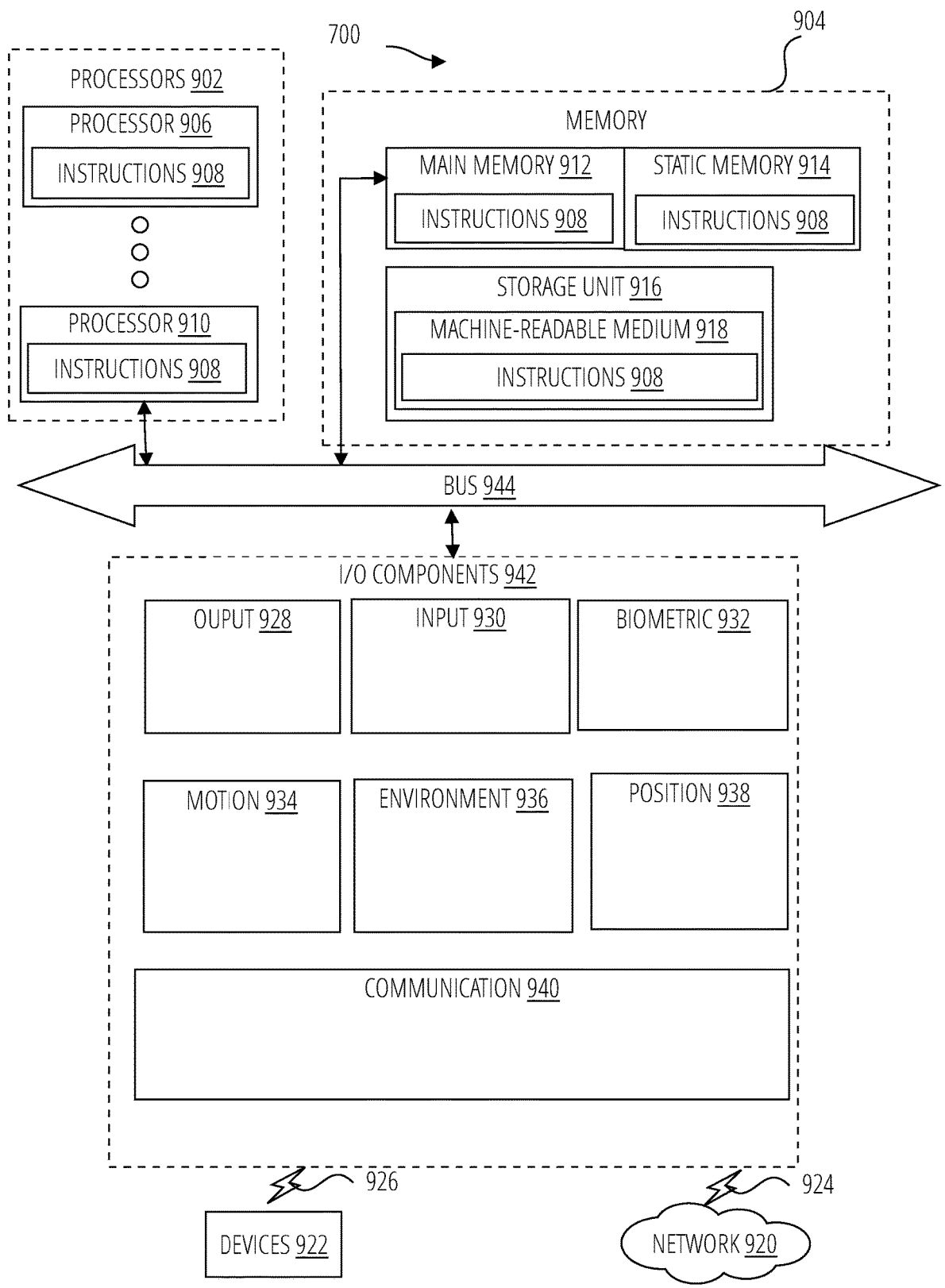
FIG. 9 is a diagrammatic representation of a machine in the form of a computer system within which a set of instructions may be executed for causing the machine to perform any one or more of the methodologies discussed herein, in accordance with some example embodiments.

FIG. 9 is a diagrammatic representation of the machine 700 within which instructions 908 (e.g., software, a program, an application, an applet, an app, or other executable code) for causing the machine 700 to perform any one or more of the methodologies discussed herein may be executed. For example, the instructions 908 may cause the machine 700 to execute any one or more of the methods described herein. The instructions 908 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 700. Further, while only a single machine 700 is illustrated, the term "machine" shall also be taken to include a collection of machines that individually or jointly execute the instructions 908 to perform any one or more of the methodologies discussed herein.

The machine 700 may include processors 902, memory 904, and I/O components 942, which may be configured to communicate with each other via a bus 944. In an example embodiment, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 7 shows multiple processors 902, the machine 700 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 within the storage unit 916, within at least one of the processors 902 (e.g., within the processor's cache memory), or any suitable combination thereof, during execution thereof by the machine 700.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 7. In various example embodiments, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location (deleted) and/or force of touches or touch gestures, or other tactile input components), audio input components (e.g., a microphone), and the like.

In further example embodiments, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location (deleted) sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 700 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location (deleted) via Internet Protocol (IP) geolocation, location (deleted) via Wi-Fi® signal triangulation, location (deleted) via detecting an NFC beacon signal that may indicate a particular location (deleted), and so forth.

The various memories (e.g., memory 904, main memory 912, static memory 914, and/or memory of the processors 902) and/or storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed embodiments.

The instructions 908 may be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   accessing, by a processor, a digital satellite image;
   generating an ortho-rectified digital satellite image based on the digital satellite image;
   generating a first discrete Fourier transform (DFT) pattern based on the ortho-rectified digital satellite image;
   determining a rational polynomial coefficient (RPC) data based on the digital satellite image;
   generating a second DFT pattern based on the rational polynomial coefficient data;
   comparing the first DFT pattern and the second DFT pattern;
   based on the comparison, calculating an image score for the digital satellite image; and
   based on the image score, determining whether the digital satellite image has been manipulated.

2. The method of claim 1, wherein the rational polynomial coefficient data describes a location of a satellite when the satellite captured the digital satellite image.

3. The method of claim 1, wherein generating the second DFT pattern comprises:
   generating a digital synthetic image;
   generating an ortho-rectified digital synthetic image based on the digital synthetic image; and
   generating the second DFT pattern based on the digital synthetic image and the ortho-rectified digital synthetic image.

4. The method of claim 3, wherein generating the ortho-rectified digital synthetic image based on the digital synthetic image comprises:
   applying the RPC data to the digital synthetic image.

5. The method of claim 1, wherein generating the ortho-rectified digital satellite image comprises:
   applying the RPC data to the digital satellite image.

6. The method of claim 1, wherein comparing the first DFT pattern and the second DFT pattern comprises:
   generating an image similarity metric based on the first DFT pattern and the second DFT pattern.

7. The method of claim 6, wherein the image similarity metric is a structural similarity index measure.

8. The method of claim 1, further comprising:
   causing display of the first DFT pattern on a graphical user interface of a client device; and
   causing display of the second DFT pattern on the graphical user interface of the client device.

9. The method of claim 1, further comprising:
   generating an analysis of a type of image manipulation based on the first DFT pattern, the second DFT pattern, and the image score.

10. A system comprising:
    a processor; and
    a memory storing instructions that, when executed by the processor, configure the system to perform operations comprising:
    accessing a digital satellite image;
    generating an ortho-rectified digital satellite image based on the digital satellite image;
    generating a first discrete Fourier transform (DFT) pattern based on the ortho-rectified digital satellite image;
    determining a rational polynomial coefficient (RPC) data based on the digital satellite image;
    generating a second DFT pattern based on the rational polynomial coefficient data;

comparing the first DFT pattern and the second DFT pattern;

based on the comparison, calculating an image score for the digital satellite image; and based on the image score, determining whether the digital satellite image has been manipulated.

11. The system of claim 10, wherein the rational polynomial coefficient data describes a location of a satellite that captures the digital satellite image.

12. The system of claim 10, wherein generating the second DFT pattern comprises:

generating a digital synthetic image;

generating an ortho-rectified digital synthetic image based on the digital synthetic image; and generating the second DFT pattern based on the digital synthetic image and the ortho-rectified synthetic digital image.

13. The system of claim 12, wherein generating the ortho-rectified synthetic digital image based on the digital synthetic image comprises:

applying the RPC data to the digital synthetic image.

14. The system of claim 10, wherein generating the ortho-rectified digital satellite image comprises:

applying the RPC data to the digital satellite image.

15. The system of claim 10, wherein comparing the first DFT pattern and the second DFT pattern comprises:

generating an image similarity metric based on the first DFT pattern and the second DFT pattern.

16. The system of claim 15, wherein the image similarity metric is a structural similarity index measure.

17. The system of claim 10, further comprising:

causing display of the first DFT pattern on a graphical user interface of a client device; and causing display of the second DFT pattern on the graphical user interface of the client device.

18. The system of claim 10, further comprising:

generating an analysis of a type of image manipulation based on the first DFT pattern, the second DFT pattern and the image score.

19. A non-transitory computer-readable storage medium, the computer-readable storage medium including instructions that when executed by a computer, cause the computer to perform operations comprising:

accessing a digital satellite image;

generating an ortho-rectified digital satellite image based on the digital satellite image;

generating a first discrete Fourier transform (DFT) pattern based on the ortho-rectified digital satellite image;

determining a rational polynomial coefficient (RPC) data based on the digital satellite image;

generating a second DFT pattern based on the rational polynomial coefficient data;

comparing the first DFT pattern and the second DFT pattern;

based on the comparison, calculating an image score for the digital satellite image; and based on the image score, determining whether the digital satellite image has been manipulated.

20. The non-transitory computer-readable storage medium of claim 19, wherein the rational polynomial coefficient data describes a location of a satellite that captures the digital satellite image.

* * * * *